United States Patent [19]

Mosch et al.

[11] Patent Number: 5,499,244
[45] Date of Patent: Mar. 12, 1996

[54] PACKET DATA RECIEVER WITH SAMPLED DATA OUTPUT AND BACKGROUND LIGHT CANCELLATION

[75] Inventors: Theo W. M. Mosch, Wormerveer, Netherlands; Yusuke Ota, Mountain Lakes; Robert G. Swartz, Tinton Falls, both of N.J.; Richard A. van Wijk, Bunschoten, Netherlands

[73] Assignee: AT&T Corp., Murray Hill, N.J.

[21] Appl. No.: 236,608

[22] Filed: May 2, 1994

[51] Int. Cl.⁶ .................................. H04J 3/12; H04L 5/22
[52] U.S. Cl. .................... 370/94.1; 370/110.1; 370/111
[58] Field of Search .......................... 320/60, 60.1, 94.1, 320/94.2, 110.1, 110.4, 111

[56] References Cited

U.S. PATENT DOCUMENTS 4,330,858  5/1982  Choquet ................................. 370/111
4,763,326  8/1988  Krick .................................. 370/110.4
4,972,408  11/1990 Le Bihan Hevre et al. ......... 370/110.4

Primary Examiner—Wellington Chin
Attorney, Agent, or Firm—John A. Caccuro

[57] ABSTRACT

A digital burst-mode packet data receiver receives high-speed burst-mode packet data signals superimposed on a lower frequency data signal. The receiver includes a first detector for detecting the received high-speed burst-mode packet data which is reset during the time period between consecutive bursts of the high-speed packet data signal. A second detector detects the lower frequency data signal during a predetermined portion of the time period between consecutive bursts of the high-speed packet data.

21 Claims, 5 Drawing Sheets

FIG. 4

| | DATA MODE | RESET MODE |
|---|---|---|
| DARK LEVEL COMPENSATOR | ENABLED | DISABLED |
| OUTPUT AMP A3 | ENABLED | DISABLED |
| SELECTOR S1 | $V_{REF}$ | $V_{REF0}$ |
| DISCHARGE CONTROL | DISABLED | ENABLED |
| SAMPLE & HOLD SH1 | HOLD | SAMPLE DURING SAMPLE SIGNAL |
| SAMPLED OUTPUT (OF A4) | CONSTANT | CHANGED DURING SAMPLE SIGNAL |

PACKET DATA RECIEVER WITH SAMPLED DATA OUTPUT AND BACKGROUND LIGHT CANCELLATION

TECHNICAL FIELD

This invention relates to digital data receivers and, more particularly, to a receiver for detecting high-frequency burst-mode packet data superimposed on a lower frequency signal.

BACKGROUND OF THE INVENTION

One form of optical communications with increasing commercial importance utilizes passive sharing of an optical fiber among several optoelectronic sources and detectors (referred to hereinafter as "optical busing").

One specific example of optical busing is the "Passive Optical Network" (PON) illustrated in FIG. 1. Here, several terminal units (Optical Network Units—ONU) are linked by one or more passive optical couplers (POC) and optical fibers to a service provider Optical Subscriber Unit (OSU) that may in turn be the gateway to an external network. Data is transmitted within the network by either or both of time division multiplexing and wavelength division multiplexing.

In one currently favored implementation of a PON, the OSU is allocated a transmit mode 110 of approximately half of each cycle to transmit information while the ONUs "listen" in a receive mode. In the second half of each cycle, the ONUs are allocated individual time slots in which to transmit data 120 while the OSU in turn listens. The data burst signals transmitted by each ONU during one of these time slots (T1–TN) are referred to as a "packet".

Our U.S. Pat. No. 5,025,456, issued on Jun. 18, 1991, and our U.S. patent applications identified by Ser. Nos. 07/976037 and 07/976039, concurrently filed on Nov. 13, 1992, resolve several problems faced by electronic receiver circuits operating in such "burst-mode" packet communication systems.

Our U.S. patent '456 describes a fundamental technique for dynamically establishing a logic threshold voltage centered between the extremes of burst-mode data signals, thus solving one well-known problem. The U.S. patent application Ser. No. 07/976037 introduces a precision peak detector reset technique for solving the problem of handling closely spaced data packets of widely varying amplitude. The U.S. patent application Ser. No. 07/976039 describes a technique for canceling out low-frequency signals due to background light on the optical bus, thus solving another problem.

In certain packet communication applications, it may be advantageous to superimpose on the bus the combination of a low-frequency signal channel along with the high-frequency packet data. For example, this low-frequency signal channel might be used for distance ranging or for communicating audio or terminal status information.

An additional difficulty is that the burst-mode packet data may have spectral energy in the same frequency band as the low-frequency signal. Yet, none of these communication channels is permitted to interfere with the proper detection of any other channel.

Thus, there is a need for a burst-mode packet data receiver which can properly detect the low-frequency signal channel along with the high-frequency packet data.

SUMMARY OF THE INVENTION

In accordance with the present invention, a digital burst-mode packet data receiver receives high-speed burst-mode packet data signals combined with a lower frequency data signal. The receiver includes a first detector for detecting the received high-speed burst-mode packet data which is reset during the time period between consecutive bursts of the high-speed packet data signal. A second detector samples the lower frequency data signal during a predetermined portion of the time period between consecutive bursts of the high-speed packet data.

More particularly, the present invention solves the prior art receiver problems by providing:

I. Independent detection of both a high-speed packet data signal and a low-frequency data signal which are superimposed on an optical bus at the same optical wavelength.

II. Low-frequency data detection means which is insensitive to spectral components of the high-speed packet data signal that may extend into the frequency band of the low-frequency data.

III. High-speed packet data signal detection means which is insensitive to the low-frequency data signal and to any other background light on the optical bus.

IV. Low-frequency detection means which does not interfere with the high-speed packet data path—by, for example, imposing special conditions on packet length, packet spacing, or bit protocol within the packet.

BRIEF DESCRIPTION OF THE DRAWING

FIG. 4 shows a table describing the data and reset modes of the present invention.

DETAILED DESCRIPTION

Figure 1:
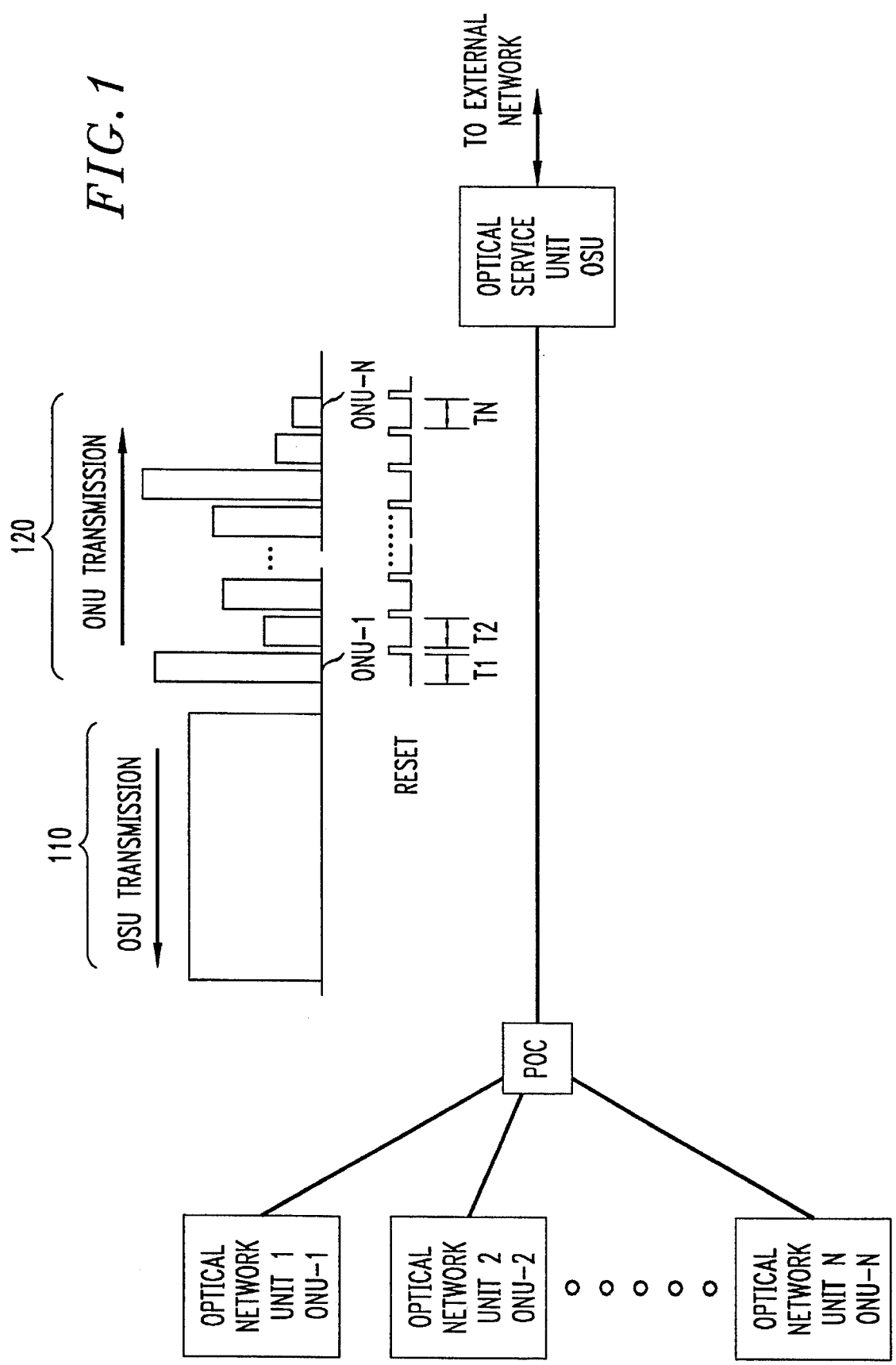
FIG. 1 illustrates an example of optical busing in a Passive Optical Network (PON) in which the present invention may be utilized.

With reference to FIG. 1, there is shown a Passive Optical Network (PON) in which a receiver, in accordance with the present invention, may be utilized. In FIG. 1, each burst-mode data packet in time slots T1–TN would originate, respectively, from one of ONU-1 through ONU-N. The burst-mode data packet in time slots T1 and T2 are, illustratively, shown in FIG. 3 as each having the same number of data bits and different amplitudes P1 and P2, respectively. These burst-mode data packets are shown superimposed on a low-frequency signal 305 which also has to be detected by the packet receiver of the present invention.

A packet receiver of the present invention must solve several problems to be effective in the PON shown in FIG. 1. First, the receiver must dynamically establish an effective logic threshold voltage centered between the extremes of the data signal swing. Ideally, this data threshold will be substantially established during the first bit of an input data burst. Second, because the bus is time-shared by many different ONU transmitters which may have widely varying power levels, the receiver electronics must be able to handle a wide range of packet amplitudes, separated by only a few bit periods in time. Third, because of various causes, there may be background optical signals on the bus at much lower frequencies than the data signal. These low-frequency signals can prevent proper detection of the high-speed data under certain conditions. The receiver must be able to prevent these low-frequency signals from interfering with proper detection of the data signal.

Figure 2:
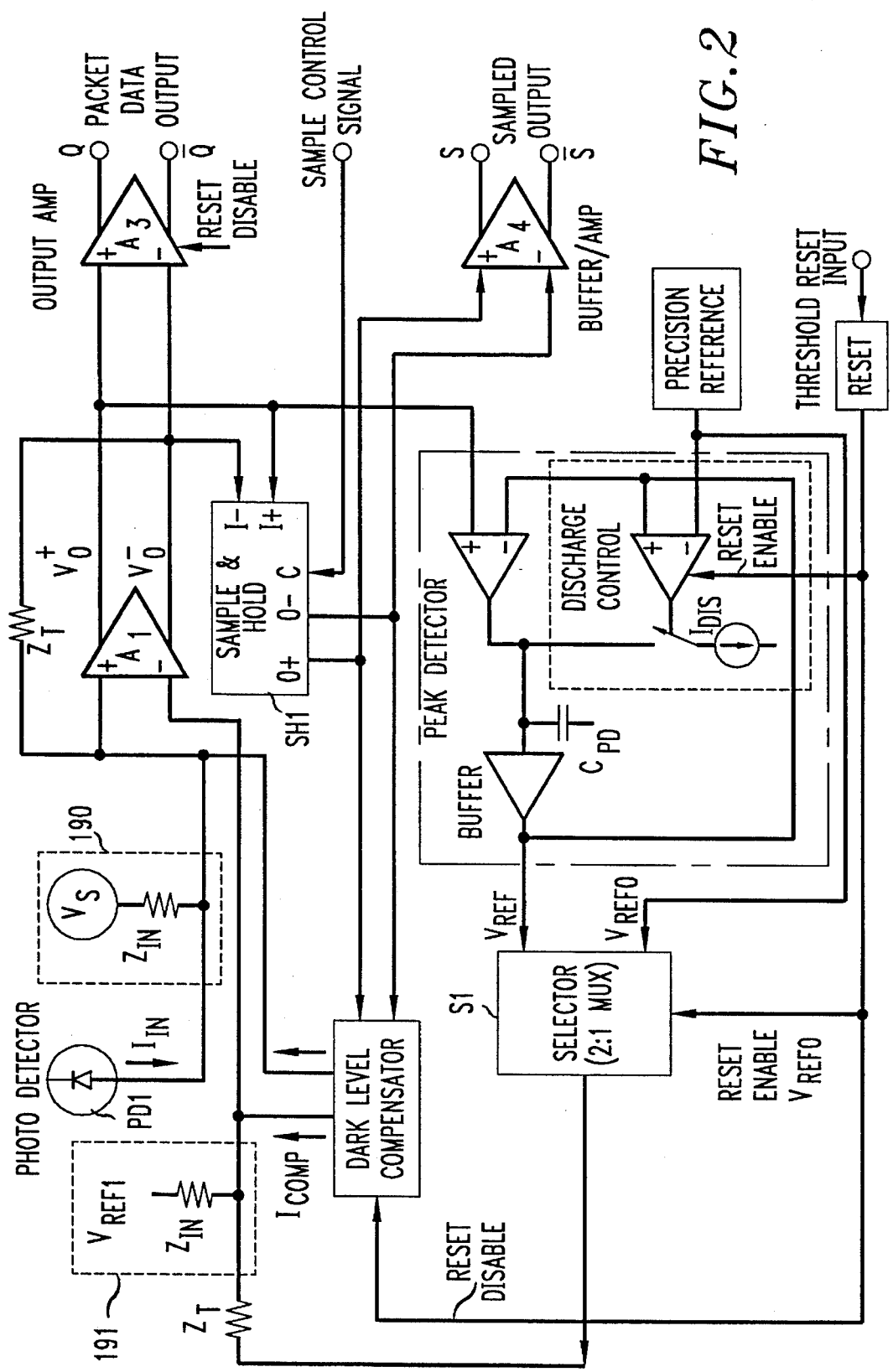
FIG. 2 shows a block diagram of a packet receiver in accordance with the present invention.

With reference to FIG. 2, we describe the operation of the present invention as illustratively implemented in a packet receiver of the OSU of FIG. 1. The packet receiver of the present invention may, illustratively, be used for reception and resolution of burst-mode data in a packet format having a predetermined number of bits per packet, as would be used in an Asynchronous Transfer Mode (ATM) application, for example.

The core of our packet receiver circuit of FIG. 2 includes the burst-mode receiver architecture of our U.S. Pat. No. 5,025,456, consisting of differential I/O Transimpedance Amplifier $A_1$, Peak Detector PD, and Output Amplifier $A_3$.

With reference to FIG. 2, optical input signals representing the data bits of the burst-mode packet data signal are received and converted by Photodiode PD1 into Photocurrent Signal $I_{IN}$. Transimpedance Amplifier $A_1$ converts the currents into a differential output voltage.

The differential output voltage of Amplifier $A_1$ is $V_0^+ - V_0^- = I_{IN} Z_T$, where $Z_T$ is the transimpedance (feedback resistor) between the positive input and negative output of $A_1$. One of $A_1$'s differential outputs, and therefore one-half of the net output swing, is sampled by the Peak Detector and stored on Capacitor $C_{PD}$. This half-amplitude reference level, $I_{IN} Z_T/2$, establishes the "instantaneous logic threshold" $V_{REF}$ and is applied to the complementary (negative) input of $A_1$ during normal "data mode" operation. The instantaneous logic threshold $V_{REF}$ is determined at the beginning of each signal burst. The logic threshold $V_{REF}$ is set equal to the half-amplitude point of the peak input signal, and subsequent signal amplification by $A_1$ is referenced to this level. Threshold $V_{REF}$ determination is very rapid, and ideally is completed by the conclusion of the first bit in the signal burst.

Variations of signal amplitude from packet to packet are accommodated using an externally provided RESET input signal to identify the interval between packets, as in our previously referenced patent application Ser. No. 07/976,037. Resetting after receiving each packet data burst ensures that the packet receiver can detect a smaller amplitude P2 data packet (e.g., in T2) that immediately follows a larger amplitude P1 data packet (e.g., in T1). This RESET input signal is an interpacket signal produced by an external circuit that keeps track of timing during a received packet and is able to predetermine the end of the packet. The RESET input signal causes a Threshold Reset circuit to generate a Reset Enable signal which causes Reset Discharge circuit to discharge Capacitor $C_{PD}$ using discharge current $I_{DIS}$.

The Reset Discharge circuit discharges the stored peak amplitude signal on capacitor $C_{PD}$ to a non-zero DC voltage, $V_{REF0}$, that is substantially equal to the baseline DC voltage stored by the Peak Detector circuit in the absence of a received input signal. This DC voltage $V_{REF0}$ is established using a Precision Reference circuit. The Reset Discharge circuit may include both coarse and fine Reset circuits (not shown) which are enabled by the reset signal. A coarse Reset circuit discharges the Detector circuit at a high rate until the stored voltage is within a predetermined voltage of the baseline DC voltage, after which it is shut off. A fine Reset circuit discharges the Detector circuit at a low discharge rate until the baseline DC voltage is reached.

The Precision Reference circuit establishes a reference voltage $V_{REF0}$ which is equivalent to a baseline voltage $V_{REF}$ generated when no input current $I_{IN}$ is received from Photodetector PD1. The Precision Reference circuit is implemented as a "clone" of $A_1$ and Peak Detector, except that no Photodetector PD1 is used.

The novel capabilities of our packet receiver, shown in FIG. 2, stem from its incorporation of very high-speed Sampling and Hold circuit SH1 and Selector (analog multiplexer) circuitry S1.

The Sample and Hold circuit SH1 may be implemented in a well-known manner. For example, see the article entitled "Fully Bipolar, 120-M Sample/s 10-b Track and Hold Circuit," written by Messrs. Vorenkamp and Verdaasdank and published in *IEEE Journal of Solid-State Circuits*, Vol. 27, No. 7, July 1992.

By means of the Sampling and Hold circuit SH1, enabled by a sample control input signal (320 of FIG. 3) having timing information derived from the RESET signal, our packet receiver has the capability of detecting the amplitude of a low-frequency light signal (305 of FIG. 3) component of the receiver input (300 of FIG. 3) in the brief interval TQ between packets. This amplitude information is provided at a special low-frequency data or "sampled" output (340 of FIG. 3). Our packet receiver thus provisionally satisfies the purpose of requirement I above, by producing both a high-speed packet data output (330 of FIG. 3) and a low-frequency sampled data output (340 of FIG. 3).

By sampling the received input signal (300 of FIG. 3) during the "quiet" interval (i.e., 320 occurs during TQ interludes) between packets, we can assure that there is no high-speed data signal present. This provisionally resolves requirement II above.

Figure 3:
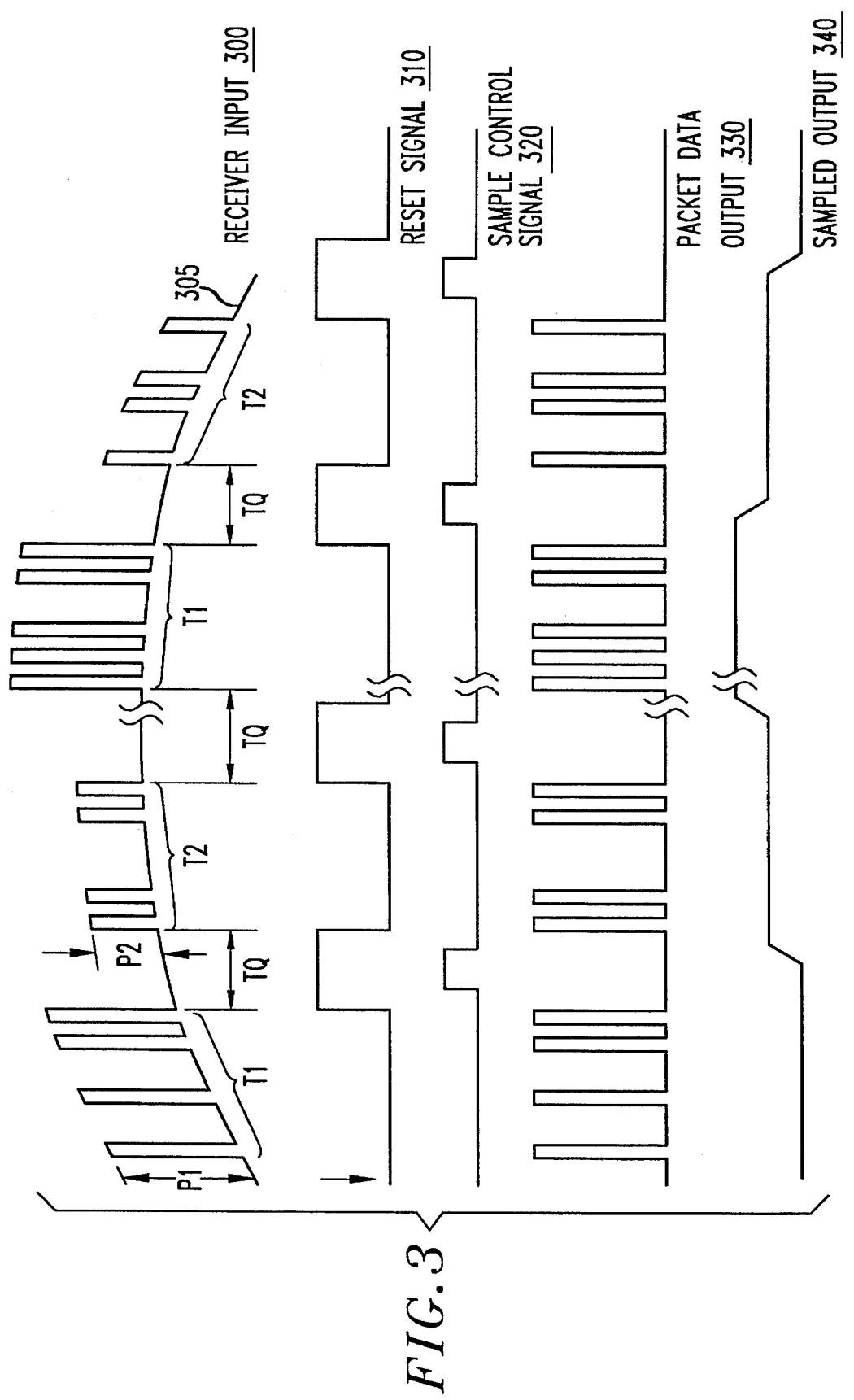
FIG. 3 shows an illustrative received burst-mode packet data signal superimposed on a low-frequency signal and the signals detected therefrom by our receiver.

After the low-frequency signal has been sampled in the quiet interval TQ between packets, this value is held by Sample and Hold circuit SH1 and converted to an equivalent differential current ($I_{COMP}$ of FIG. 2) which is subtracted from the received input signal during the subsequent high-speed data packet intervals (e.g., T1, T2 of FIG. 3). Recall that amplifier $A_1$ has a transimpedance of $Z_T$ (i.e., $\delta V_0 = I_{IN}^* Z_T$). The background light compensation circuit has an equivalent transconductance that is approximately $1/Z_T$, i.e., the inverse characteristic of $A_1$. This "dark level compensator" linearly converts the voltage stored in SH1 to a differential output current, $I_{COMP}$, according to this inverse characteristic. It thus effectively cancels the low-frequency signal (305 of FIG. 3) at all times (T1–TN) as well as any other background light that may be present, except for the quiet interval TQ between packets, so that it does not interfere with burst-mode detection of the high-speed packet data during times T1–TN. This resolves requirement III above.

Data packet protocols ensure that there must be a "quiet" interval TQ between data packets. That is because (1) there must be a timing cushion to prevent adjacent packets (e.g., T1, T2) from interfering with one another, and (2) a RESET time is required to discharge the burst-mode Peak Detector, in preparation for receipt of the next packet. Consequently, sampling during the quiet interval TQ (using the sample signal) does not violate requirement IV above by interfering with the packet data protocols. However, during the RESET input signal, the output Amplifier $A_3$ should be disabled (by Reset Disable signal) while the Peak Detector is being discharged. That is necessary because it would otherwise have undetermined outputs during the reset operation.

To ensure stable voltage levels within the circuit, we normally must wait until the end of the Peak Detector RESET operation before we can begin the interpacket sampling operation described above. That requires that RESET signal and Sampling signal operations be performed sequentially, which will necessarily increase the required time to complete these operations.

In accordance with the invention, an analog multiplexer (i.e., Selector S1 of FIG. 2) is used to isolate the Peak Detector from the input Amplifier $A_1$ during the RESET/Sample operations, so that resetting of the Peak Detector can proceed simultaneously with low-frequency sampling. This allows a considerable reduction in the required total time.

The following paragraphs review the operation of our packet receiver circuit of FIG. 2 during the DATA and RESET modes.

DATA MODE

With reference to the table shown in FIG. 4, during the DATA mode, the RESET signal is in a negative state. Hence, the Dark Level Compensator and output Amplifier $A_3$ are enabled, the Selector S1 selects the Peak Detector output $V_{REF}$, the Discharge circuit is disabled, the Sample and Hold circuit SH1 is in the hold mode and the sample output is constant.

At the beginning of a data burst, one-half of the peak value of Amplifier $A_1$'s positive differential output is stored on Peak Detector Capacitor $C_{PD}$, and is routed through the high-speed Selector S1 (an analog, unity gain multiplexer) back to the negative input of Amplifier $A_1$. This half-amplitude signal becomes an effective logic threshold at Amplifier $A_1$'s input, and subsequent data signals are defined as either logic ONE or ZERO, depending on whether they are above or below this threshold. The differential signal from Amplifier $A_1$ is then further amplified by output Amplifier $A_3$ and appears across outputs Q and $\bar{Q}$.

RESET MODE

With joint reference to FIGS. 2 and 4, at the conclusion of a data packet during the quiet interval TQ, a RESET signal is delivered to the packet receiver. The RESET signal causes several actions to occur: (a) the receiver's high-speed packet data output Amplifier $A_3$ is disabled, i.e., clamped to a low (logic ZERO) state (this ensures that that output does not suffer spurious logic transitions during RESET); (b) the high-speed Selector S1 is switched so that it provides a fixed DC reference $V_{REF0}$ to the negative input of $A_1$; (c) the Peak Detector Capacitor $C_{PD}$ discharge control circuitry is activated; and (d) the Dark Level Compensator circuit is disabled or turned off.

In the RESET mode, the Peak Detector Capacitor $C_{PD}$ is discharged to prepare the circuit for the next packet. At about the same time, a pulse may be delivered to the Sample and Hold circuit SH1. This activates the Sample and Hold circuit SH1, which measures and stores the differential output of Amplifier $A_1$ at this time. Amplifier $A_1$'s output voltage during the interval between packets will be related to low-frequency information as well as background light. This signal is delivered to the Sample Buffer/Amp $A_4$ to provide an external voltage (sampled outputs S and $\bar{S}$) proportional to the light present between packets.

At the conclusion of the RESET signal, the Dark Level Compensator is again enabled and converts the Sample and Hold signal (from SH1) into a compensatory differential input current $I_{COMP}$. This compensatory differential current $I_{COMP}$ exactly cancels the photocurrent due to the low-frequency signal and also that due to background light.

Note that although the implementation we have described utilizes a current input, it does not preclude the use of a voltage input (e.g., $V_S$ of 190 in FIG. 2) using well-known techniques in the art for converting current input Transimpedance Amplifier $A_1$ into a voltage amplifier. One example of how this could be implemented is shown in FIG. 2 using a voltage input source $V_S$ and input impedance $Z_{IN}$ connected to the positive input of Amplifier $A_1$ and a reference voltage $V_{REF1}$ connected through an input impedance $Z_{IN}$ to the negative input of Amplifier $A_1$ (see 191).

Figure 5:
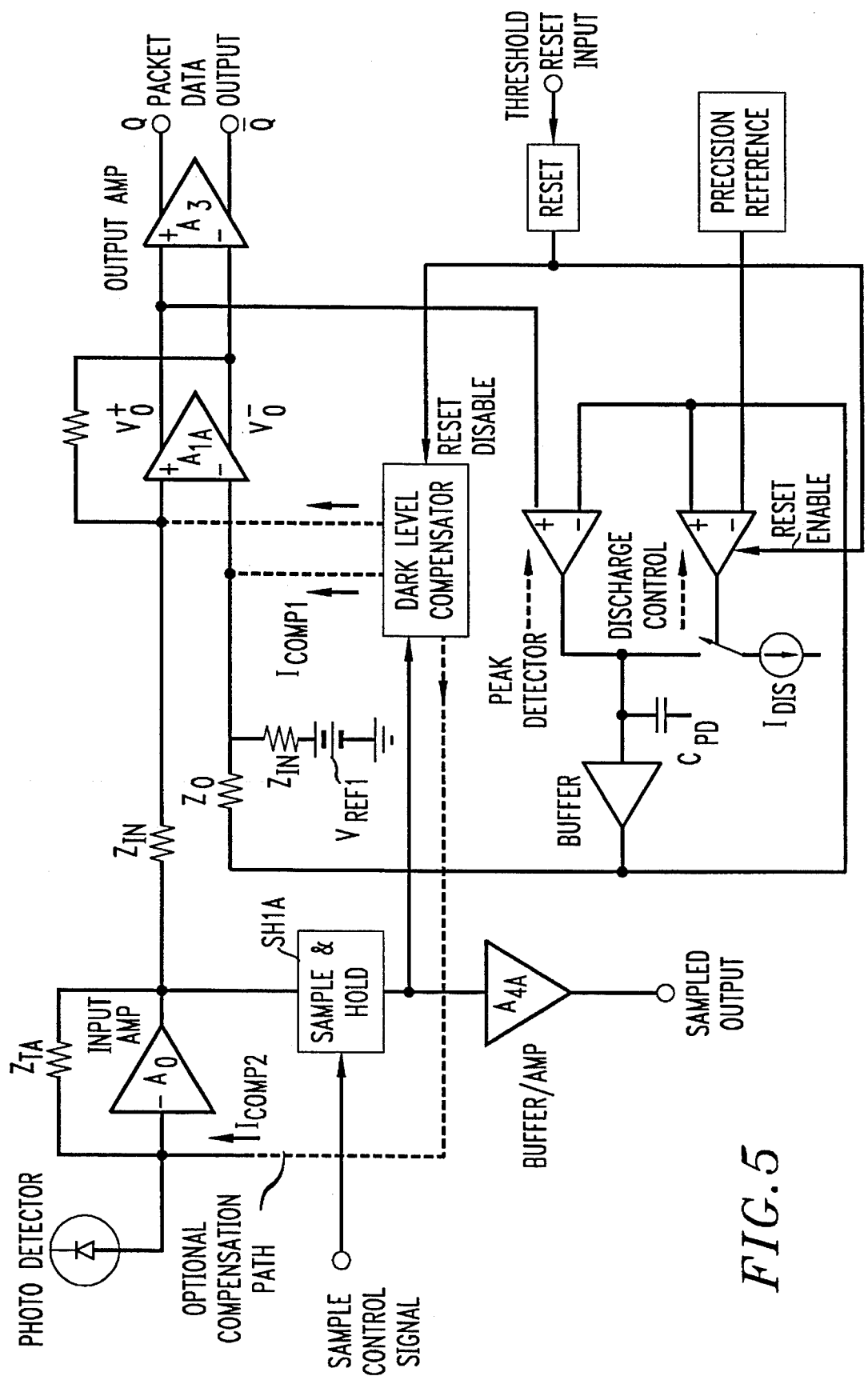
FIG. 5 depicts another receiver embodiment for performing packet data and low-frequency data detection.

Also note that although the detailed implementation we have described, in FIG. 2, uses an analog Selector S1 in the peak detector feedback loop to reduce the required packet spacing, as described above, it would be a straight forward proposition to utilize instead separate amplifier chains (for the Sampled output and Packet Data output) along with a voltage input burst-mode amplifier to accomplish substantially the same purpose, as illustrated in FIG. 5.

There, the Packet Data output is generated via transimpedance Amplifier $A_0$, voltage Amplifier $A_{1A}$, and output Amplifier $A_3$. The Sampled output is generated by transimpedance Amplifier $A_0$, Sample and Hold circuit SH1A and Buffer Amplifier $A_{4A}$. After the low-frequency signal has been sampled in the quiet interval TQ between packets, this value is held by Sample Hold circuit SH1A and converted to an equivalent differential current ($I_{COMP1}$ of FIG. 5) by the "dark level compensator" which is subtracted from the received input signal during the subsequent high-speed data packet intervals (e.g., T1, T2 of FIG. 3). It thus effectively cancels the low-frequency signal (305 of FIG. 3) at all times (T1–TN) as well as any other background light that may be present, except for the quiet interval TQ between packets, so that it does not interfere with burst-mode detection of the high-speed packet data during times T1–TN. By subtracting compensation current $I_{COMP1}$ from the input to amplifier $A_{1A}$, we can eliminate dark currents from the receiver. Optionally, compensation current $I_{COMP2}$ (shown by dotted lines) can be used to eliminate dark currents at the input to Amplifier $A_0$. The implementation and operation of the comparable circuits of FIG. 5 are essentially the same as the similar circuits described for FIG. 2.

In the disclosed embodiment, the analog circuit blocks are actually either well-known ECL gates, or simple modifications of ECL gates. The ECL gate consists of a differential pair with current source load, followed by an emitter follower stage. These circuits, while offering limited gain, are inherently very fast. The input Amplifier $A_1$, output Amplifier $A_3$, Peak Detectors, Buffer Amplifier, and Precision Reference may be implemented using circuits which are described in more detail in our article entitled "DC-1Gb/s Burst-Mode Compatible Receiver for Optical Bus Applications," by Yusuke Ota, et al., *Journal of Lightwave Technology*, Vol. 10, No. 2, February 1992.

While the disclosed embodiment of the present invention is implemented using bipolar integrated embodiment circuit technology, it should be noted that other circuit technologies could be utilized, including FET.

The circuit can be implemented using, for example, silicon, gallium arsenide or other appropriate semiconductor materials. Moreover, it is contemplated that other well-known circuits can be used to implement the amplifier circuit functions shown in FIGS. 2 and 5 without departing from the teaching of the present invention.

Although the present invention has been described for use with optical signals, it should be understood that the present invention can be utilized in nonoptical signals as well.

Thus, what has been described is merely illustrative of the application of the principles of the present invention. Other methods and circuits can be implemented by those skilled in the art without departing from the spirit and scope of the present invention.

We claim:

1. A digital burst-mode packet data receiver for simultaneously receiving a high-speed burst-mode packet data signal and a lower frequency data signal, comprising.

first means for detecting the high-speed burst-mode packet data signal, means for receiving a reset signal during a time period between consecutive packet data bursts of the high-speed packet data signal, means, responsive to said reset signal, for resetting the first means for detecting to a reference level, and second means, responsive to said reset signal, for detecting the lower frequency data signal during a predetermined portion of the time period between consecutive packet data bursts of the high-speed packet data without interference from said high-speed burst-mode packet data signal.

2. The receiver of claim 1 wherein:

said second means for detecting is enabled during said predetermined portion defined by a received sample signal occurring in the absence of said received signal.

3. The receiver of claim 1 wherein said first means for detecting includes:

a DC-coupled differential input amplifier circuit having first input means for receiving said packet data bursts, second input means for receiving a reference signal, and output means for outputting a data output signal and peak amplitude detector means for detecting and storing a peak amplitude of said data output signal and for generating said reference signal at an output port.

4. The receiver of claim 3 wherein said second means for detecting utilizes a signal path that is independent of said DC-coupled differential input amplifier circuit.

5. The receiver of claim 3 wherein said resetting means includes selector means, responsive to a reset signal, occurring during the time period between consecutive bursts of the high-speed packet data, for
   a) disconnecting said peak amplitude detector means output port from said second input means of said input amplifier circuit and discharging said peak amplitude signal stored by said peak amplitude detector means, and
   b) connecting a precision reference voltage as said reference signal to said second input means of said input amplifier circuit.

6. The receiver of claim 5 wherein:

said peak amplitude detector means is discharged to a non-zero DC voltage substantially equal to an initial DC voltage which is stored by said peak amplitude detector means during the absence of a high-speed burst-mode packet data.

7. The receiver of claim 1 wherein said second means for detecting includes:

detector means for generating said lower frequency data signal by sampling said data output signal in response to both said reset signal and a sample control input signal for defining said predetermined portion of the time period between consecutive packet data bursts.

8. The receiver of claim 7 wherein:

said first means for detecting includes means for subtracting said lower frequency data signal from the high-speed burst-mode packet data signal when said reset and sample control signals are absent.

9. The receiver of claim 8 further including:

photodetector means for generating an input current for the receiver from a received high-speed burst-mode data signal and wherein said means for subtracting generates a compensation current which is subtracted from an input current to said first means for detecting.

10. The receiver of claim 1 wherein:

said first means for detecting detects at its input resulting electrical current changes generated in response to the received high-speed packet data signal and said second means for detecting detects at its input resulting electrical current changes generated in response to the received lower frequency data signal.

11. The receiver of claim 1 wherein:

said first means for detecting detects at its input electrical voltage changes generated in response to the received high-speed packet data signal and said second means for detecting detects at its input electrical voltage changes generated in response to the received lower frequency data signal.

12. A digital burst-mode packet data receiver for receiving high-speed burst-mode packet data and lower frequency data signals, comprising means for detecting the high-speed burst-mode packet data so that said lower frequency data signals do not affect detection of the high-speed burst-mode packet data, means for resetting the burst-mode packet data detector to a reference level in response to a first state of a received reset signal occurring between consecutive bursts of the high-speed packet data, and means for detecting the lower frequency data signals, in response to both the first state of the received reset signal and a received sample signal, such that said high-speed burst-mode packet data does not affect detection of the lower frequency data signal.

13. A digital packet data receiver for receiving bursts of digital packet data, comprising a DC-coupled differential input amplifier circuit having first input means for receiving said digital packet bursts, second input means for receiving a reference signal, and output means for outputting a data output signal;

first detector means for detecting and storing a peak amplitude of said data output signal and for generating said reference signal at an output port;

second detector means for generating a sample data output signal of said data output signal in response to both an inter-packet reset signal and a sampled control input signal; and selector means, responsive to said reset signal, for
    a) disconnecting said first detector means output port from said second input means of said input amplifier circuit and discharging said peak amplitude signal stored by said first detector means, and
    b) connecting a precision reference voltage as said reference signal to said second input means of said input amplifier circuit.

14. The receiver of claim 13 wherein:

said first detector means is discharged to a non-zero DC voltage substantially equal to an initial DC voltage which is stored by said first detector means during an absence of a received signal to said receiver.

15. A digital burst-mode packet data receiver for simultaneously receiving a high-speed burst-mode packet data signal and a lower frequency data signal, comprising:

first detector means, enabled during a first time period occurring during a received burst of the high-speed packet data signal, for detecting the high-speed burst-mode packet data, and reset to a reference level during a second time period occurring between consecutive bursts of the high-speed packet data signal, and second detector means, operable independent of said first detector means and enabled during a predetermined time period, for detecting the lower frequency data signal.

16. The receiver of claim 15 wherein:

said second detector means is enabled during a portion of said second time period.

17. The receiver of claim 15 wherein:

said second detector means is disabled during said first time period.

18. The receiver of claim 15 wherein:

detector means for generating said lower frequency data signal is enabled by sampling said data output signal in response to both an inter-packet reset signal and a sample control input signal.

19. The receiver of claim 18 wherein:

said second detector means includes means for subtracting said lower frequency data signal from the high-speed burst-mode packet data signal when said reset and sample control signals are absent.

20. The receiver of claim 19 further including:

photodetector means for generating an input current for the receiver from a received high-speed burst-mode data signal and wherein said means for subtracting generates a compensation current which is subtracted from said receiver input current.

21. The receiver of claim 19 further including:

photodetector means for generating an input current for the receiver from a received high-speed burst-mode data signal and wherein said means for subtracting generates a compensation current which is subtracted from an input current to said first detector means.

* * * * *